US009336679B1

(12) United States Patent
Chitale et al.

(10) Patent No.: US 9,336,679 B1
(45) Date of Patent: May 10, 2016

(54) MEASURING TRAFFIC CONDITION BASED ON MOBILE DEVICES CONNECTION INFORMATION

(71) Applicants: Ajay Shrikant Chitale, Bangalore (IN); Vaasanthi Jagannath, Bangalore (IN); Sukanta Maikap, Bangalore (IN); Deepak Patta, Bangalore (IN); Rajeev Ramaswamy, Bangalore (IN)

(72) Inventors: Ajay Shrikant Chitale, Bangalore (IN); Vaasanthi Jagannath, Bangalore (IN); Sukanta Maikap, Bangalore (IN); Deepak Patta, Bangalore (IN); Rajeev Ramaswamy, Bangalore (IN)

(73) Assignee: Ariba, Inc., Sunnyvale, CA (US)

( * ) Notice: Subject to any disclaimer, the term of this patent is extended or adjusted under 35 U.S.C. 154(b) by 0 days.

(21) Appl. No.: 14/574,022

(22) Filed: Dec. 17, 2014

(51) Int. Cl.
*H04W 4/02* (2009.01)
*G08G 1/052* (2006.01)
*G08G 1/01* (2006.01)
*H04W 24/10* (2009.01)
*G08G 1/015* (2006.01)

(52) U.S. Cl.
CPC .............. *G08G 1/0125* (2013.01); *G08G 1/012* (2013.01); *G08G 1/015* (2013.01); *G08G 1/0141* (2013.01); *H04W 4/02* (2013.01); *H04W 24/10* (2013.01)

(58) Field of Classification Search
CPC ... G08G 1/0125; G08G 1/012; G08G 1/0141; G08G 1/015; G08G 1/052; G08G 1/0112; H04W 4/02; H04W 4/025; H04W 4/027; H04W 24/10
See application file for complete search history.

(56) References Cited

U.S. PATENT DOCUMENTS

| 5,732,383 | A   | * | 3/1998  | Foladare ............. G08G 1/0104 455/456.5 |
| 7,197,320 | B2  | * | 3/2007  | Joseph .................... H04W 4/02 455/414.2 |
| 7,912,628 | B2  | * | 3/2011  | Chapman ........... G01C 21/3691 701/117 |
| 8,296,046 | B2  | * | 10/2012 | de los Reyes ...... G01C 21/3492 455/456.5 |
| 8,538,377 | B2  | * | 9/2013  | Colonna ............. G08G 1/0104 455/405 |
| 2011/0165890 | A1 | * | 7/2011  | Ho ....................... G01C 21/265 455/456.1 |
| 2012/0253656 | A1 | * | 10/2012 | Brandt ............... G01C 21/3484 701/410 |
| 2015/0287319 | A1 | * | 10/2015 | Cama ....................... G08G 1/07 701/117 |

FOREIGN PATENT DOCUMENTS

EP         1081666 A2 *   3/2001

* cited by examiner

*Primary Examiner* — Michael J Zanelli
(74) *Attorney, Agent, or Firm* — Fountainhead Law Group P.C.

(57) ABSTRACT

Systems and methods for measuring traffic condition based on mobile device connection information are provided. An example method includes, at a computer system having one or more processors and memory storing one or more programs for execution by the one or more processors: identifying, in a plurality of geographical areas, a first geographical area; selecting, in a plurality of cellular towers, a first cellular tower providing cellular coverage to the first geographical area; determining a first total number of cellular signal pings received by the first cellular tower over a first predefined time period; estimating a traffic volume factor for the first geographical area in accordance with the first total number of cellular signal pings; and providing traffic condition associated with the first geographical area to a user, in accordance with the traffic volume factor.

20 Claims, 6 Drawing Sheets

MEASURING TRAFFIC CONDITION BASED ON MOBILE DEVICES CONNECTION INFORMATION

BACKGROUND

The present disclosure relates to computing and data processing, and in particular, to measuring traffic condition based on mobile device connection information.

Measuring traffic condition is important: knowing how fast or slow others are traveling on a highway or a local street, a user can adjust his/her driving route on the fly to cut commute time.

Difficulties abound, however. One technical problem is that, in some cases, measuring traffic condition relies on roads being equipped with speed sensors and the availability of speed sensor data to the public. Some roads (e.g., service streets or county roads in rural areas) are sometimes constructed without speed sensors. Even if speed sensors are available, data collected from these sensors may be restricted for governmental use only, and thus not made available to end users.

Another technical problem is that, in other cases, measuring traffic condition relies on GPS devices, either as a smart phone component or a stand-alone device. Some mobile devices (e.g., traditional cellular phones), however, may not be equipped with a GPS device, and thus incapable of providing and receiving traffic conditions this way.

There is therefore a need for improved techniques for measuring traffic condition based on mobile device connection information.

SUMMARY

In one embodiment, a method includes identifying, at a computer system having one or more processors and memory storing one or more programs for execution by the one or more processors, in a plurality of geographical areas, a first geographical area; and selecting, in a plurality of cellular towers, a first cellular tower providing cellular coverage to the first geographical area. The method next determines a first total number of cellular signal pings received by the first cellular tower over a first predefined time period, estimates a traffic volume factor for the first geographical area in accordance with the first total number of cellular signal pings, and provides traffic condition associated with the first geographical area to a user, in accordance with the traffic volume factor.

In another embodiment, a non-transitory computer readable storage medium stores one or more programs comprising instructions for: identifying, in a plurality of geographical areas, a first geographical area; selecting, in a plurality of cellular towers, a first cellular tower providing cellular coverage to the first geographical area; determining a first total number of cellular signal pings received by the first cellular tower over a first predefined time period; estimating a traffic volume factor for the first geographical area in accordance with the first total number of cellular signal pings; and providing traffic condition associated with the first geographical area to a user, in accordance with the traffic volume factor.

In another embodiment, a computer implemented system comprises one or more computer processors memory; and one or more programs. The one or more programs are stored in the memory and configured to be executed by the one or more processors. The one or more programs include instructions for: identifying, in a plurality of geographical areas, a first geographical area; selecting, in a plurality of cellular towers, a first cellular tower providing cellular coverage to the first geographical area; determining a first total number of cellular signal pings received by the first cellular tower over a first predefined time period; estimating a traffic volume factor for the first geographical area in accordance with the first total number of cellular signal pings; and providing traffic condition associated with the first geographical area to a user, in accordance with the traffic volume factor.

The following detailed description and accompanying drawings provide a better understanding of the nature and advantages of the present disclosure.

DETAILED DESCRIPTION

Described herein are techniques for measuring traffic condition based on mobile device connection information. The apparatuses, methods, and techniques described below may be implemented as a computer program (software) executing on one or more computers. The computer program may further be stored on a non-transitory computer readable medium, such as a memory or disk, for example. A computer readable medium may include instructions for performing the processes described below. In the following description, for purposes of explanation, numerous examples and specific details are set forth in order to provide a thorough understanding various aspects of the present disclosure. It will be evident, however, to one skilled in the art that embodiments of the present disclosure as defined by the claims may include some or all of the features in these examples alone or in combination with other features described below, and may further include modifications and equivalents of the features and concepts described herein.

The embodiments described herein provide various technical solutions to measure traffic condition based on mobile device connection information, and in particular to the above-identified technical problems. One example set forth below may, to measure traffic condition within a geographical area that a user intends to travel to or across, estimate (1) a traffic volume factor or (2) a traffic speed factor based on cellular signal pings received by a cellular tower covering the geographical area.

Introductory Example

As a non-limiting example, in order to provide, to a user, traffic condition for the San Francisco-Oakland Bay Bridge (the Bay Bridge), a server system first locates a cellular tower providing cellular signal coverage for the Bay Bridge, using a cell tower coverage/location database.

Next, based on how many cellular signal pings received in the past 5 minutes by that cellular tower, the server system estimates a traffic volume factor—how many users are physically present (e.g., travelling) on the Bay Bridge. Optionally, based on how much distance these users travel in a 10 or 30 seconds time window, the server system estimates a traffic speed factor—how fast (or slow) these users are travelling.

Based on these factors, the server system then determines traffic conditions on the Bay Bridge and provides this information to the user.

By these way, a server system may measure/estimate traffic conditions for a particular geographical area using cellular signal pings received by one or more cellular towers within—and providing coverage to—the particular geographical area. These techniques are advantageous, as they do not rely on roads being equipped with speed sensors or the availability of speed sensor data. Nor do they require a GPS device.

Additional Details of Disclosed Embodiments

Additional details of implementations are now described in relation to the figures.

Figure 1:
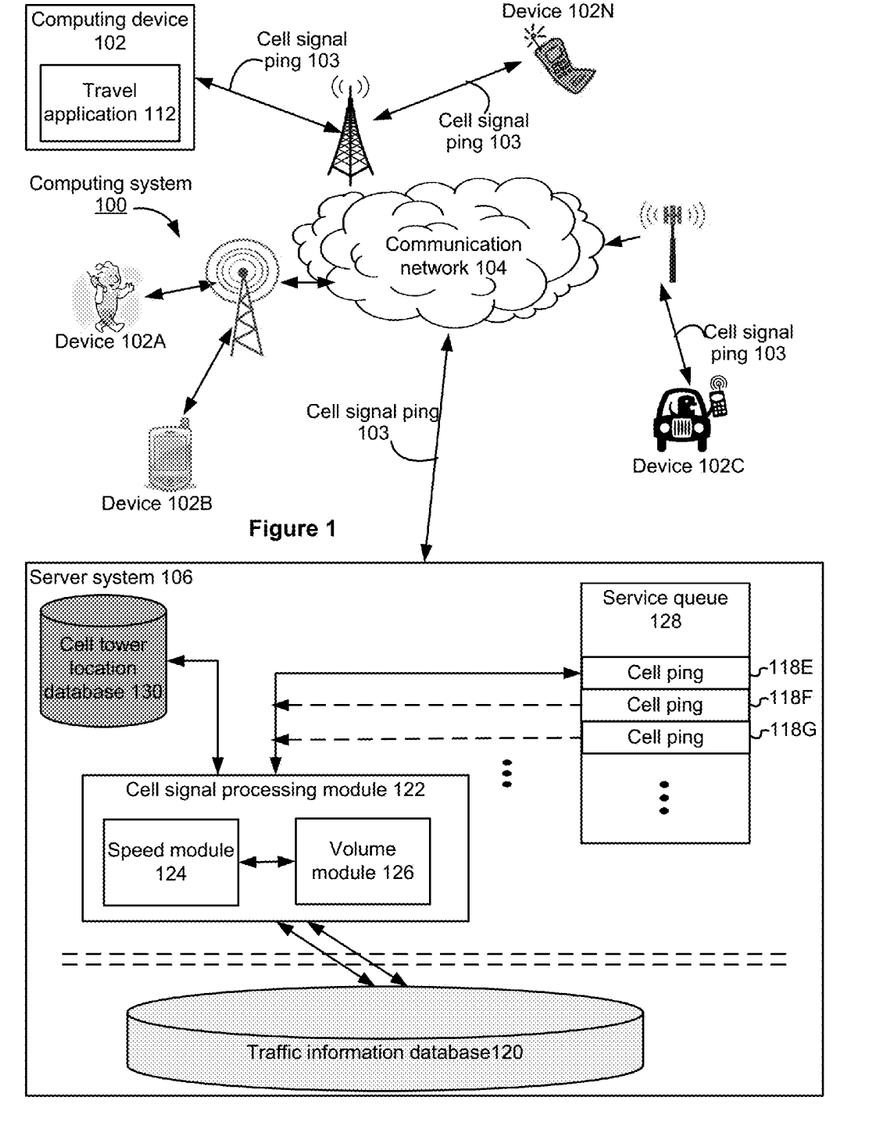
FIG. 1 is an example block diagram illustrating a computing system for measuring traffic condition based on mobile device connection information in accordance with one embodiment.

FIG. 1 is an example block diagram illustrating a computing systems for measuring traffic condition based on mobile device connection information, in accordance with one embodiment.

In one embodiment, the computing system 100 includes one or more computing devices 102 (e.g., 102A, 102B, 102C, . . . , and 102-N), a communication network 104, and a server system 106.

In one embodiment, a computing device 102 enables a user to interact with one or more travel applications resident thereon, which in turn communicate with (e.g., transmit and receive traffic information to and from) the server system 106 (for example, a traffic information database 120 implemented thereon).

In one embodiment, a computing device 102 transmits one or more cellular signal pings to a nearby cell tower as part of a cellular communication with another computing device 102 and the cell tower. The server system 106 then uses these cellular signal pings to calculate, determine, or approximate the physical location of the computing device 102 and a user associated therewith. A cellular communication may include an electronic message, such as a voice call, a video call, a text message, and an email.

For example, when a user receives a voice mail on his/her cellular phone, the cellular phone communicates with a nearby cellular tower, thereby pinging the cellular tower one or more times. In some cases, a cellular device connects with the most close-by tower, in terms of physical distance, among a plurality of available cellular towers (because the most close-by tower may provide the best signal strength).

Based on these data, in some cases, the location of a cellular tower receiving a cellular device's ping is used to approximate a user's physical location. For example, if user Tom's cell phone has pinged a first tower in the city of Mountain View, Calif., a second tower in the city of Palo Alto, Calif., and then a third tower in the city of Foster City, Calif., it may be concluded that user Tom was physically present at these locations, and that he was travelling on one or more roads (either major thoroughfares or local streets) connecting these locations.

In one embodiment, the computing device 102 is a mobile computing device, such as a regular cellular phone (without a GPS component), a smart phone, a laptop computer, a notebook computer, a smart watch, or a tablet computer. In one embodiment, a computing device 102 is a light weight client device (also referred to herein as a client 102).

In one embodiment, a computing device 102 is not equipped with a GPS device/component that is capable of providing geographical location of the computing device by way of GPS coordinates. In an alternative embodiment, a computing device 102 is equipped with a GPS device, which can be switched on or off by a user.

In one embodiment, the computing device 102 includes a travel application 112. The computing device 102 obtains user requests in the travel application 112 and submits corresponding requests to the server system 106. For example, a cellular phone user may request a driving route using a route planning application. In response, a cloud system may provide a suggested route and traffic conditions relating to the suggested route and nearby streets.

In some cases, the travel application 112 is a route planning application for driving, bicycling, boating, walking, or jogging activities. In other cases, the travel application 112 is a traffic condition monitoring application, which generates alerts when traffic conditions in a predefined area meet predefined criteria. For example, the travel application 112 may generate popup messages when average travelling speed on a user-selected 5-mile stretch of U.S. highway 101 is less than 25 miles per hour.

In some embodiments, the travel application 112 is a map application, which provides maps, satellite or aerial, and traffic information relating to one or more regions shown in a map portion. For example, the travel application 112 may provide map for the city of Foster City, Calif., and traffic conditions on the same map for streets (highway or local roads) in Foster City, Calif.

In one embodiment, the communication network 104 interconnects one or more computing devices 102 with each other and with the cloud system 106. In one embodiment, the communication network 104 optionally includes the Internet, one or more local area networks (LANs), one or more wide area networks (WANs), other types of networks, or a combination of such networks.

In one embodiment, the server system 106, based on cell signal pings 103 received from a computing device 102, determines or approximates a computing device 102's physical location. In one embodiment, the server system 106, based on (1) one or more approximated physical locations of a computing device and (2) the time difference between the computing device's presences at these locations, determines or approximates the user's speed of travel (e.g., movement speed) and optionally mode of transportation.

For example, user Andy's cellular phone may ping a first cellular tower located in the downtown area of the city Palo Alto, Calif. at 12 pm, and at 12:20 pm (20 minutes later) ping a second cellular tower located on the outskirt of the city of Foster City, Calif. (which is 15 miles away from Palo Alto, Calif.).

Based on these data, the server system 106 may determine that the user Andy is travelling at an average speed of 45 miles per hour and is thus likely travelling by a motor vehicle, e.g., by car or by boat.

In some cases, a cellular phone's movement is attributed to (or used to approximate movement of) a particular user that has an active login on an application running on the cellular phone. For example, a cellular phone's locations may be attributed to user Andy, because user Andy has an active login on a travel or map application running thereon.

For another example, user Gilbert's smart phone may ping a first cellular tower located in the city of Menlo Park, Calif. at 12 pm, and at 12:40 (40 minutes later) ping a second cellular tower located on the edge of the city of East Palo Alto, Calif. (which is approximately 2 mile away from Menlo Park, Calif.).

Base on this information, the server system 106 may conclude that the user Gilbert is travelling at an average speed of 5 miles per hour and is thus likely travelling by foot, for example jogging or walking.

In an alternative embodiment, the server system 106 may determine or approximate a computing device's physical location based on cellular tower triangulation techniques.

For example, a computing device may ping 3 cellular towers, one after another, within a 10-second time window to determine which one of the three towers offers the strongest signal reception. Accordingly, a server system may determine that the computing device is physically located in an area where the coverages of these towers overlap.

Also, in other embodiments, the server system 106 determines or approximates user's speed of travel (or movement speed) and optionally mode of transportation based on cellular tower triangulation techniques. For example, a user's cellular phone may ping three cellular towers (e.g., towers A, B, and C) at 12 pm, and another three cellular towers (e.g., towers C, D, and E) 20 minutes later. Base on this information, the server system may determine that the cellular phone—and the user—is first physically located in a first area where the coverages of the first three towers overlap, and 20 minutes later physically located in a second area where the coverages of the second three towers overlap.

Next, based on the differences in time (20 minutes) and in distances (1 mile) between the users presences in these two areas, the server system 106 may determine that user is travelling at a speed of 3 miles per hour on average and is thus likely travelling by foot, for example either jogging or walking.

In other alternative embodiments, the server system 106 also determines or approximates a computing device's physical locations based on a GPS component or device associated with (built into or communicably connected with) the computing device.

In still other alternative embodiments, the server system 106, based on a computing device's approximated physical locations determined using GPS technologies, and the time difference between the computing device's presences at these locations, determines or approximates a speed of travel and optionally a mode of transportation associated with a user of the computing device.

For example, a computing device's GPS component may provide to the server system (1) a first set of GPS coordinates representing a location within in the city of Mountain View, Calif. (e.g., latitude: 37 23.516; and longitude −122 02.625), and 30 minutes later (2) a second set of GPS coordinates representing a location 15 miles away within the city of Foster City, Calif. (e.g., latitude: 37 59.895; and longitude −122 27.985).

Based on these data, the server system may determine that the user (under whose login the smart phone is operating) is travelling at a speed of 30 miles per hour and is thus likely travelling by a motor vehicle (a car, a motor bicycle, or a boat) or by a relatively high speed non-motorized vehicle (a race bicycle).

In one embodiment, the server system 106 includes a cell signal processing module 122, a service queue 128, a cell tower location database 130, and a traffic information database 120. In one embodiment, the cell signal processing module 122 includes a speed module 124 and a volume module 126.

The cell signal processing module 122, based on cell signal pings received by the server system 106, determines a traffic speed factor and a traffic volume factor for a particular geographical area.

The volume module 126 determines or approximates a total number of user physically present in a geographical area. For example, based on how many cellular signal pings receiving by a cellular tower over the past 5 minutes, the volume module 126 may determine a total number of users present in the geographical area covered by the cellular tower.

The speed module 124 determines or approximates a user's travel/movement speed within one or more geographical areas. For example, based on the user's physical location 1 at time 1 and the user's physical location 2 at time 2, the speed module 124 may determine that the user's travel speed (or an approximation thereof) is:

[the travel distance between the physical location 2 and the physical location 1] divided by [time difference between time 2 and time 1].

The service queue 128 hosts cellular signal pings received by one or more cellular towers within a predefined time period. For example, the service queue 128 may include cellular signal pings transmitted by a same cellular device to multiple cellular towers, which the server system may use to approximate the cellular device's travel speed.

For another example, the service queue 128 may include cell signal pings transmitted to a same cellular tower by multiple cellular devices, which the server system may use to approximate how many cellular devices are within the cellular tower's coverage.

The cell tower location database 130 stores and manages physical locations of one or more cellular towers, e.g., locations of cellular towers, with the San Francisco Bay Area. In one embodiment, the cell tower location database 130 also stores and manages a cellular tower's signal coverages, such as a 5 mile radius from where in the cellular tower is physically located.

The traffic information database 100 stores and manages traffic information associated with one or more geographical areas/regions, such as, average travel speed on a major thoroughfare across town, crowdedness (or lack thereof) of a one-lane service road, and traffic accidents (or lack thereof) at a selected intersection.

Figure 2:
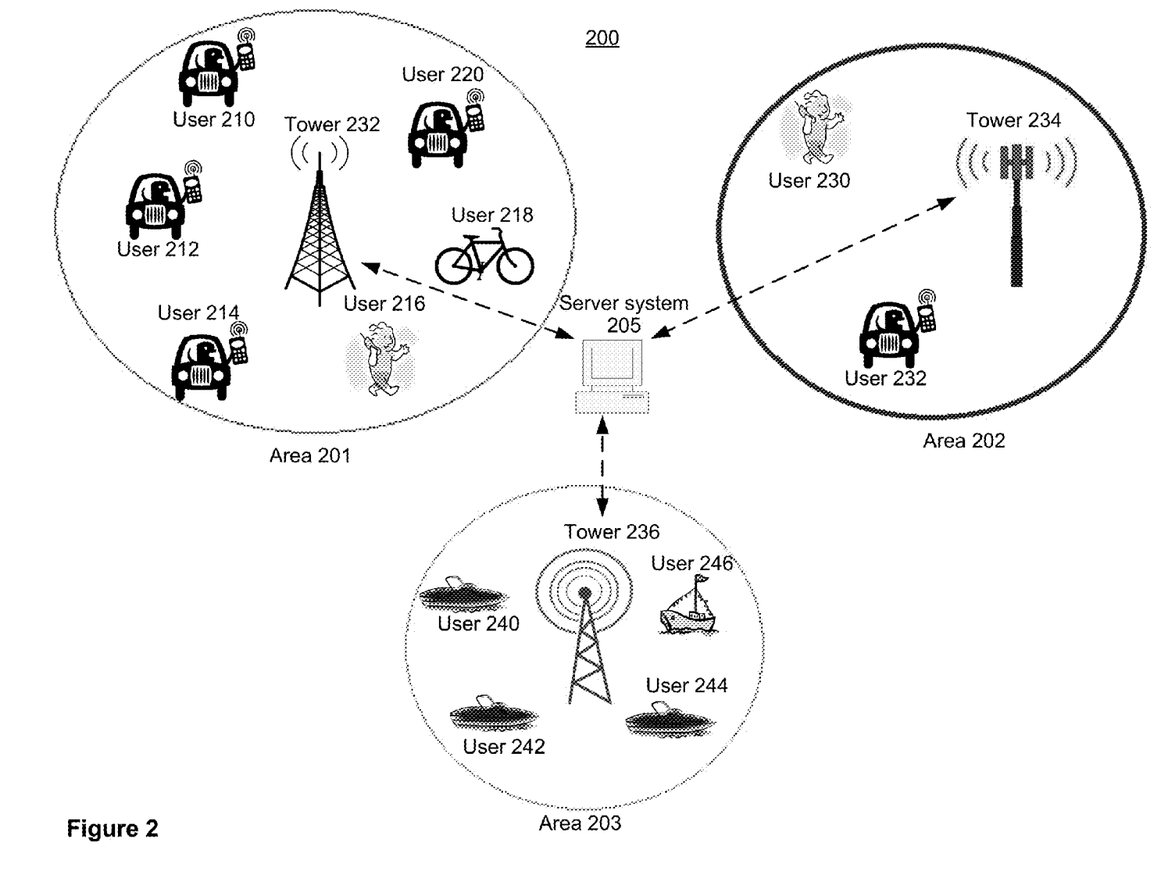
FIG. 2 is an example block diagram illustrating a method for measuring traffic volume factors based on mobile device connection information in accordance with one embodiment.

FIG. 2 is an example block diagram illustrating a method for measuring traffic volume factors based on mobile device connection information in accordance with one embodiment.

As shown in FIG. 2, in one embodiment, cell signal pings sent by users 210-220 are received by tower 232 (which covers the geographical area 201), cell signal pings sent by users 230-232 are received by tower 234 (which covers the geographical area 202), and cell signal pings sent by users 240-246 are received by tower 236 (which covers the geographical area 203).

One or more of these cellular signal pings are then transmitted to the server system 205, which in turn measures or approximates traffic conditions within the areas 201-203.

Concerning area 201, based on cell signal pings received by tower 232, the server system 205 may conclude (A) that there are 6 users present, (B) that users 210-214 and 220 are travelling at a relatively high rate of speed (and thus likely by car), (C) that users 218 is travelling at a relatively low rate of speed (and thus likely by foot), and (D) that user 216 is travelling at a moderate rate of speed (and thus likely by bicycle).

Similarly, concerning the area 202, the server system 205, based on cell signal pings received by the tower 234, may conclude (A) that there are 2 users present, (B) that user 230 is travelling at a relatively low rate of speed (and thus likely by foot), and (C) that user 232 is travelling at a relatively high rate of speed (and thus likely by car).

Furthermore, concerning area 203, the server system 205 may conclude, based on tower 236's physical location, that area 203 is a water area, such as a lake or a bay area. The server system 205 may additionally conclude, based on cell signal pings received by tower 236, (A) that there are 4 users present, (B) that users 240-244 are travelling at a relatively high rate of speed (and thus likely by motor boat), and (C) that user 246 is travelling at a moderate rate of speed (and thus likely by sail boat or kayak).

The server system may then transmit traffic condition information relating to these area to one or more users, to facilitate their travel.

Figure 3:
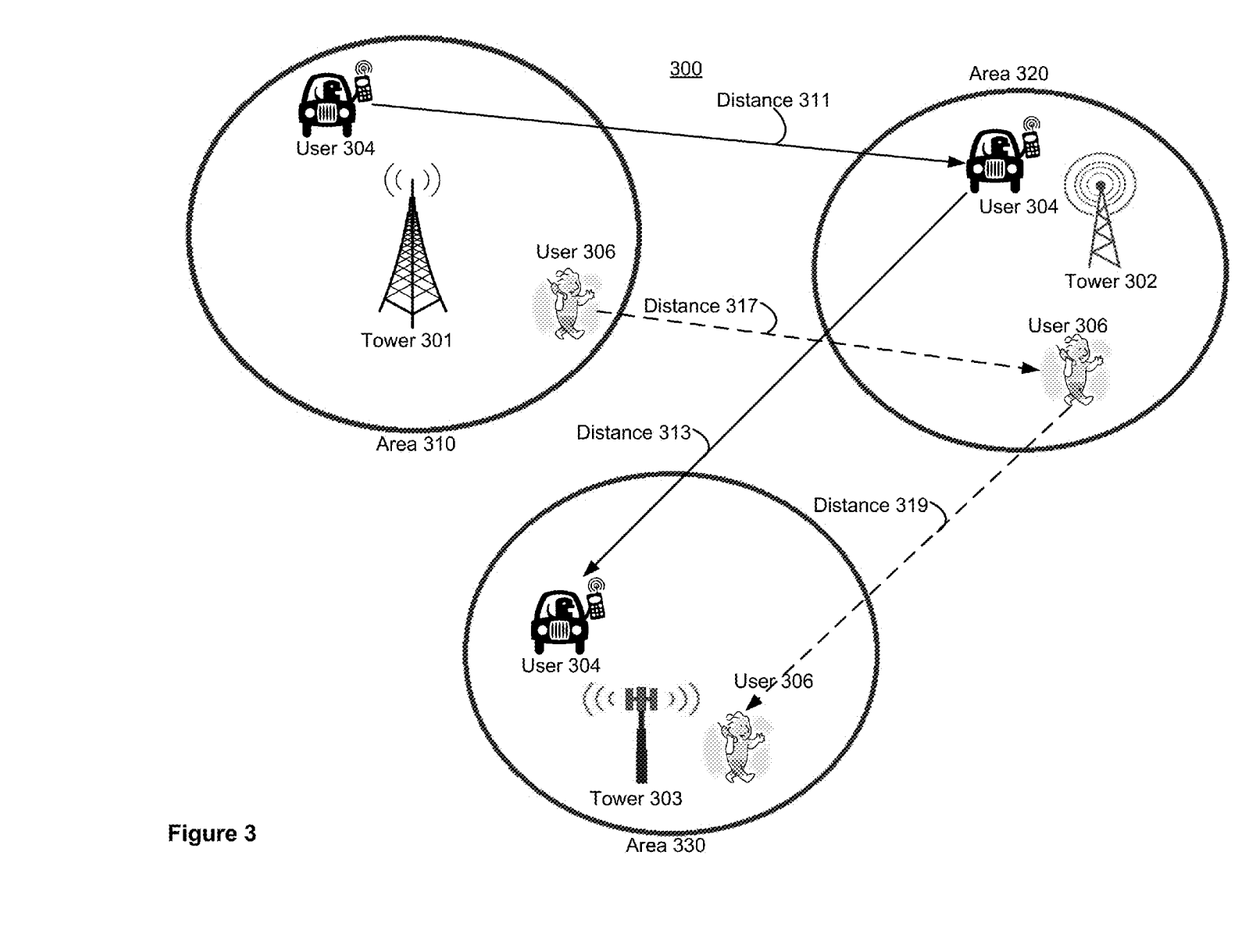
FIG. 3 is an example block diagram illustrating a method for measuring traffic speed factors based on mobile device connection information in accordance with one embodiment.

FIG. 3 is an example block diagram illustrating a method for measuring traffic speed factors based on mobile device connection information in accordance with one embodiment.

As shown in FIG. 3, in one embodiment, a cellular communication component of user 304's vehicle (e.g., an OnStar device) pings cellular tower 301 at time 1 and tower 302 at time 2. Using a cell tower location database and coverage information stored therein, a server system may determine that the cellular tower 301 covers area 310 and the cellular tower 302 covers area 320.

Based on cellular signal pings received by these towers within a particular time window, the server system may additionally determine that user 304 is physically present within area 310 at time 1 and then within area 320 at time 2.

Using a cell tower location database, a server system may determine, with a predefined level of certainty/confidence, (A) that user 304 has traveled distance 311 between area 310 and area 320 over the time difference between time 2 and time 1. Optionally, the server system may also determine (B) that user 304 is travelling at a certain speed (e.g., 55 miles per hours) and (C) that user 304 is using a particular mode of transportation (e.g., by car).

Similarly, at a later time (time 3), the cellular communication component of user 304's vehicle pings cellular tower 303. Based on this information, the server system may further determine that user 304 is physically present within area 330 (which is covered by cellular tower 303) at time 3. The server system may also determine that user 304 has traveled from area 310 to area 320 and then to area 330, and offer traffic condition information relating to this travel. Relevant traffic condition information may include road side service stations, average traffic speed, posted speed limits, and nearby motels and restaurants.

As also shown in FIG. 3, in one embodiment, a cellular communication component of user 306's phone pings tower 301 at time 4, tower 302 at time 5, and tower 303 at time 6. Based on these data, the server system may conclude that user 306 was physically present within area 310, area 320, and area 330 at time 4, time 5, and time 6, respectively. The server system may also conclude that user 306 is walking (e.g., due to its low travel speed) from area 310 to area 320 and then to area 330, and may therefore offer traffic condition information and items of interest relating to this walk, such as navigation instructions to side streets (with fewer traffic lights or less motor vehicle traffic) and locations of road side convenience stores.

As explained above, in some cases, the server system measures not only a user's physical locations over time, but also attempts to determine a mode of movement/transportation. This is advantageous. Knowing where a user has been and currently is enables a server system to estimate a user's travel route. Knowing how a user is travelling (e.g., by foot, by bike, or by car) further enables the server system to offer traffic conditions relevant to the user's travel. For example, a pedestrian, such as a morning jogger, is more likely to be interested in traffic conditions relating to side streets, such as residential streets with little motor vehicle traffic. In contrast, a commercial driver, such as a fleet truck driver, is more likely to be interested in traffic conditions relating to major thoroughfares, such as interest state highways.

Figure 4:
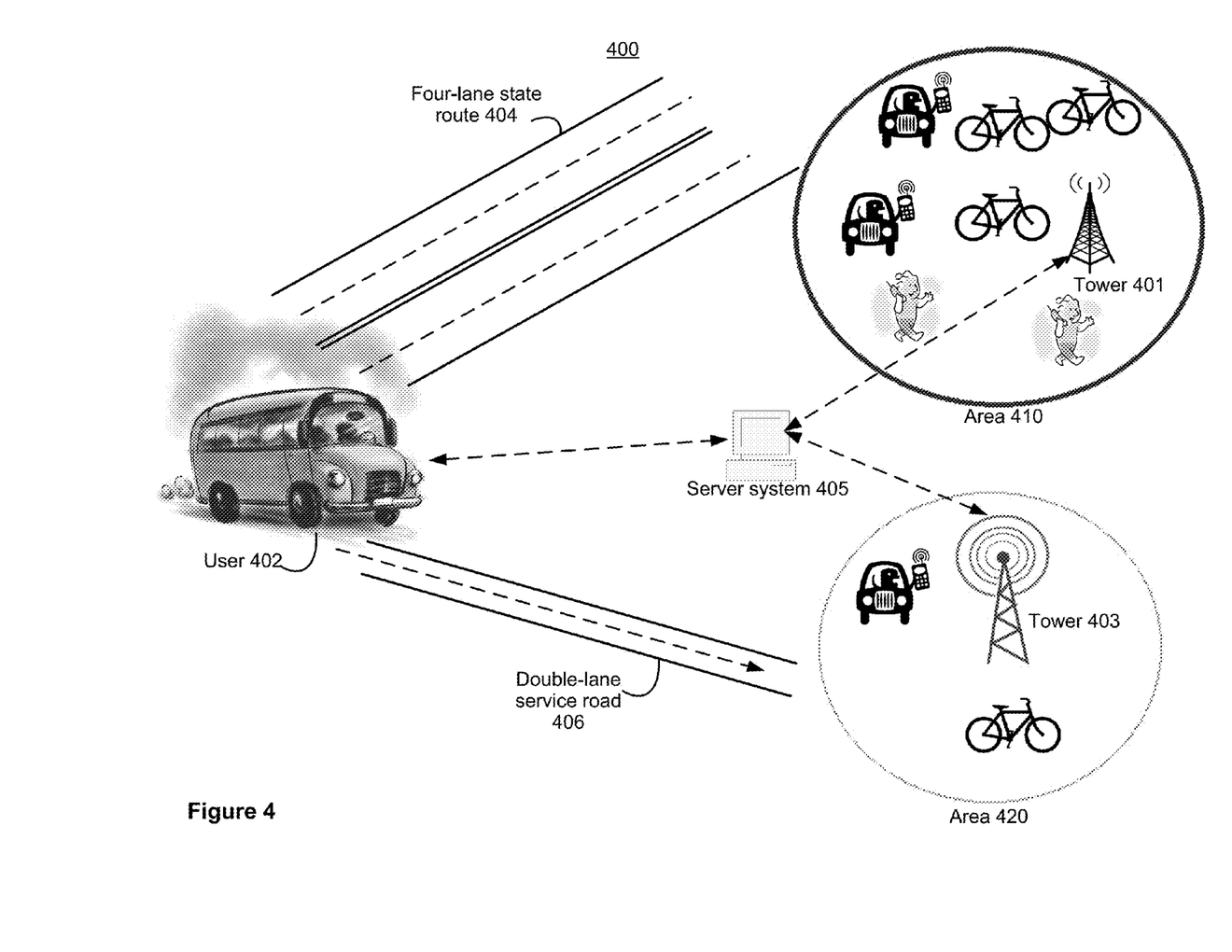
FIG. 4 is an example block diagram illustrating a method for recommending traffic routes based on mobile device connection information in accordance with one embodiment.

FIG. 4 is an example block diagram illustrating a method for recommending traffic routes based on mobile device connection information in accordance with one embodiment.

As shown in FIG. 4, in some cases, a user can dynamically select a travel route in accordance with traffic condition measured based on cellular signal pings.

In some cases, based on the total number of cell signal pings received by cellular tower 401 over a predefined time period (e.g., past 2 minutes), the server system 405 determines that there are seven users present within area 410 (which is covered by cellular tower 401).

Also based on these users' speeds of movement, the server system 405 determines that two of these users are travelling/moving by a motor vehicle (e.g., by car), three are by an un-motorized vehicle (e.g., by bike), and another two are by foot.

Similarly, based on the total number of cell signal pings received by tower 403 over another predefined time period (e.g., past 5 minutes), the server system 405 determines that there are two users present within the area 420.

Also based on these users' speeds of movement, the server system may determine that one of these users is moving by a motor vehicle (e.g., by car) and the other is by an un-motorized vehicle (e.g., by bike).

Based on information gathered above, the server system 405 provides (A) traffic conditions of the four-lane state 404 crossing the area 410 and (B) traffic conditions of the double-lane service road 406 crossing the area 420. The traffic conditions provided by the server system 405 is sometimes transmitted, via a cellular communication network, to user 402 or a mobile computing device associated therewith, such as a smart phone, a smart watch, a laptop computer, or a GPS device.

Next, based on traffic conditions regarding the areas 410 and 420, the server system may recommend user 402 to take double-lane service road 406 in favor of four-lane state route 404, even though ordinarily a four-lane state route offers better commute than does a double-lane service road.

In some cases, the traffic conditions and route recommendations are automatically provided to user 402 by the server system 405, while during user 402's travel. These approaches are advantageous, as they dynamically inform a user of traffic conditions, without interrupting the user's travelling experience. For example, these technique do not require a user to exit a highway, find a service station, and use a computer to obtain traffic condition information). Nor a user needs to constantly request traffic condition updates, which may not be feasible while travelling.

Furthermore, because traffic conditions are provided on a real time basis, a user can dynamically adjust his/her travel plan in accordance therewith, thereby cut overall commute time and enhance travel experience. For example, a user may be notified when traffic conditions worsens at a key bridge (e.g., the Golden Gate Bridge) and recommended to take an alternative route where traffic congestion is not present.

Figure 5:
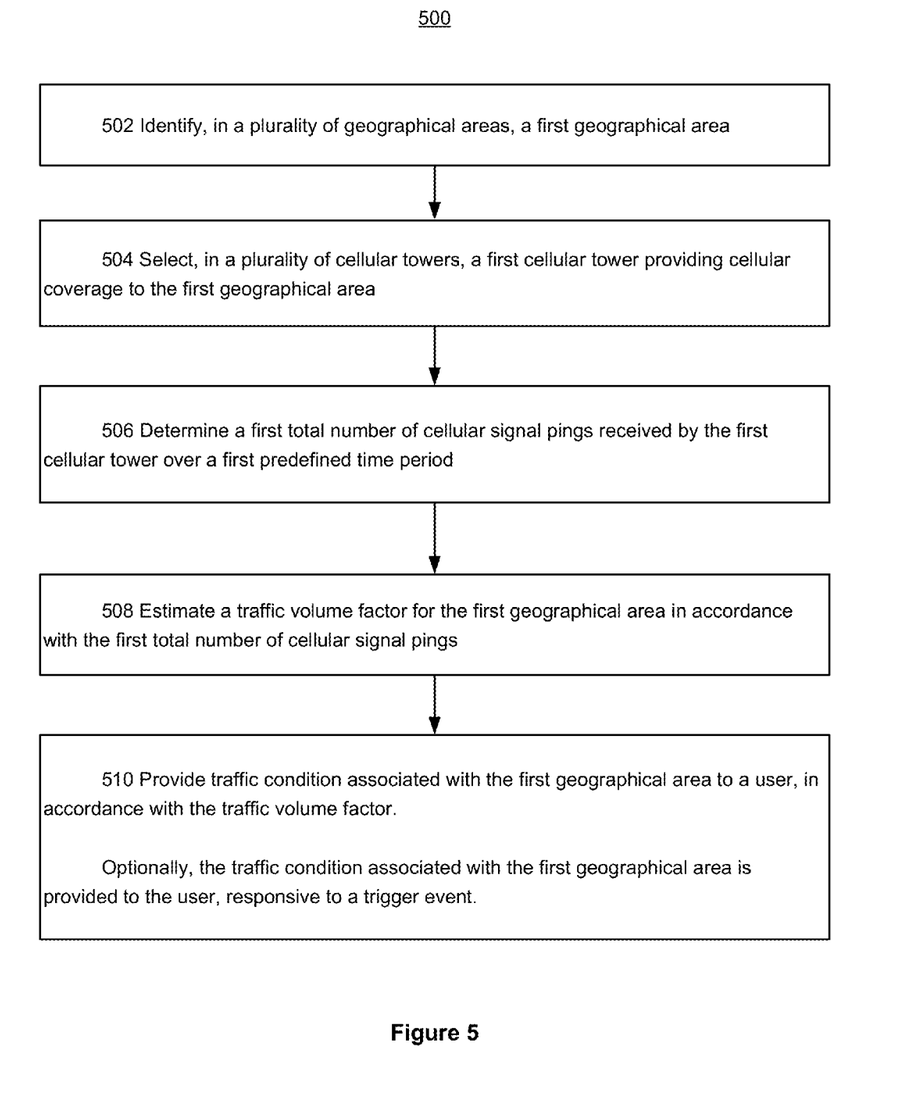
FIG. 5 is an example flow chart illustrating a forth method for measuring traffic condition based on mobile device connection information in accordance with one embodiment.

FIG. 5 is an example flow chart illustrating a method for measuring traffic condition based on mobile device connection information, in accordance with one embodiment.

In one embodiment, the method 500 is implemented at a computer system, such as the server system 106 as shown in FIG. 1. In one embodiment, the computer system is equipped with one or more processors and memory storing one or more programs for execution by the one or more processors.

In one embodiment, the method 500 includes first identifying (502), in a plurality of geographical areas, a first geographical area. For example, after a user selects an area of interest on a map application or a driving route planning application, a server system displays a scalable view of the selected area. The server system may also display additional information relating to the selected area, such as sites of interests, major streets, service roads, or intersections.

The method 500 further includes selecting (504), in a plurality of cellular towers, a first cellular tower providing cellular coverage to the first geographical area. For example, by referencing a cell tower location database, the server system determines which one or more cellular towers provide cellular signal coverage to the area selected/identified at 502.

Then, the method 500 proceeds to determine (506) a first total number of cellular signal pings received by the first cellular tower over a first predefined time period. For example, the server system, via the cell signal processing module 122 shown in FIG. 1, may reference a service queue and cell signal pings recorded therein. The server system may then determine how many cell signal pings the cellular tower selected/identified at 502 has received in the past 10 seconds. Based on this information, the server system may then determine/approximate a total number of cellular devices (or computing devices) physically present in the selected geographical area.

Then, the method 500 estimates (508) a traffic volume factor for the first geographical area in accordance with the first total number of cellular signal pings. For example, the server system may determine a total number of users present in the selected geographical area (also called a traffic volume factor) and the crowdedness (or lack thereof) of the selected geographical area.

In one embodiment, the method 500 then provides (510) traffic condition associated with the first geographical area to a user in accordance with the traffic volume factor. For example, the server system may provide traffic condition within the selected geographical area to a user, based on (among other factors) the determined total number of users present in the selected geographical area.

In one embodiment, the traffic volume factor is visualized for a user's ease of reference. For example, an icon with variable sizes is used to represent the total number of users present in a geographical area. For another example, a large dot represents 30 or more users being present within a selected geographical area, and a small dot represents 5 or fewer users being present within the selected geographical area.

In one embodiment, the traffic volume factor corresponds to a first total number of a first plurality of users physically present in the first geographical area; and a respective user in the first plurality of users physically present in the first geographical area is associated with a respective speed of movement; and the method 500 further comprises: estimating a traffic speed factor for the first geographical area in accordance with the respective speed of movement associated with the respective user in the plurality of users; and providing the traffic condition associated with the first geographical area to the user, in accordance with the traffic speed factor.

For example, in some cases, a server system optionally estimates a traffic speed factor, based on one or more users' travel speeds within the selected geographical area, and then provides traffic conditions to a user in accordance with the traffic speed factor.

In one embodiment, the traffic speed factor is also visualized. In some cases, a green color is used (e.g., overlaid on a street in a map application) to represent that users with a selected geographical area are travelling at a relatively high or moderate speed. A red or black color is used to represent that users with the selected geographical area are travelling at a relatively low speed or in other words experiencing traffic congestions.

In one embodiment, the method 500 further comprises: estimating a mode of transportation for the respective user in the first plurality of users based on the respective speed of movement associated with the respective user. For example, based on a user's travel speed, the server system may determine that the user is travelling by foot, by bicycle, by car, or by train.

In one embodiment, the method 500 further comprises: obtaining information associated with the first geographical area affirmatively entered by a first user in the first plurality of users; and providing the traffic condition associated with the first geographical area to the user, in accordance with the information affirmatively entered by the first user. For example, a user may enter traffic conditions in a map application, and a server system takes into account these user-entered traffic conditions when providing traffic condition information to other users. This is advantageous, as user-provided traffic conditions are more likely to be accurate and up-to-date. For example, a user can pin-point a highway exit blocked due to an accident occurred just 10 seconds ago, and this information can be used by the server system to provide traffic condition relating to the highway to other users.

In one embodiment, estimating the traffic volume factor for the first geographical area in accordance with the first total number of cellular signal pings includes: identifying two or more cellular signal pings, in the first total number of cellular signal pings, as sent by a same user; and adjusting the traffic volume factor in accordance with the two or more cellular signal pings. For example, when estimating how many users are present within a selected area based on cellular signal pings received by a cellular towers, a server system may filter out duplicative pings sent out by a same cellular device (and thus by a same user). This way, the total number of users present in an area is more accurately estimated.

In one embodiment, the method 500 further comprises: obtaining road construction characteristics associated with one or more streets within the first geographical area; and providing the traffic condition associated with the first geographical area to the user, in accordance with the road construction characteristics associated with one or more streets. For example, in some cases, a server system also takes advantage of known road conditions, e.g., made available in one or more public databases, when providing traffic conditions and/or suggesting driving routes to a user.

For another example, a server system may consult highway information databases made available by a public transportation agency (e.g., the Caltrans), when providing traffic condition information and/or recommending a driving route to a user. A highway information database may include information such as: a particular street has a very low posted speed limit, a street crosses a school zone, and a highway requires snow chains during winter months.

In one embodiment, the traffic condition associated with the first geographical area is provided to the user, responsive to a trigger event. For example, upon detecting that a user is within 20 miles of a selected area (e.g., downtown San Francisco, Calif.), a server system automatically begins to provide and update traffic conditions within the selected area on a user's cellular phone or an in-car display device, so that the user can be automatically and timely notified on traffic conditions relating to his/her destination.

In one embodiment, the trigger event is customized by the user. For example, a user can customize when to receive traffic conditions and updates thereto, for example during a traffic congestion, 10 minutes away from a congested area, or within 10 miles of a selected town/city.

In one embodiment, the trigger event is defined by the computing system. For example, the server system can determine when to provide traffic conditions and one or more subsequent updates to a user, e.g., during a traffic congestion, after the congestion has cleared, or after a serious accident has occurred in an area that a user is heading into.

Figure 6:
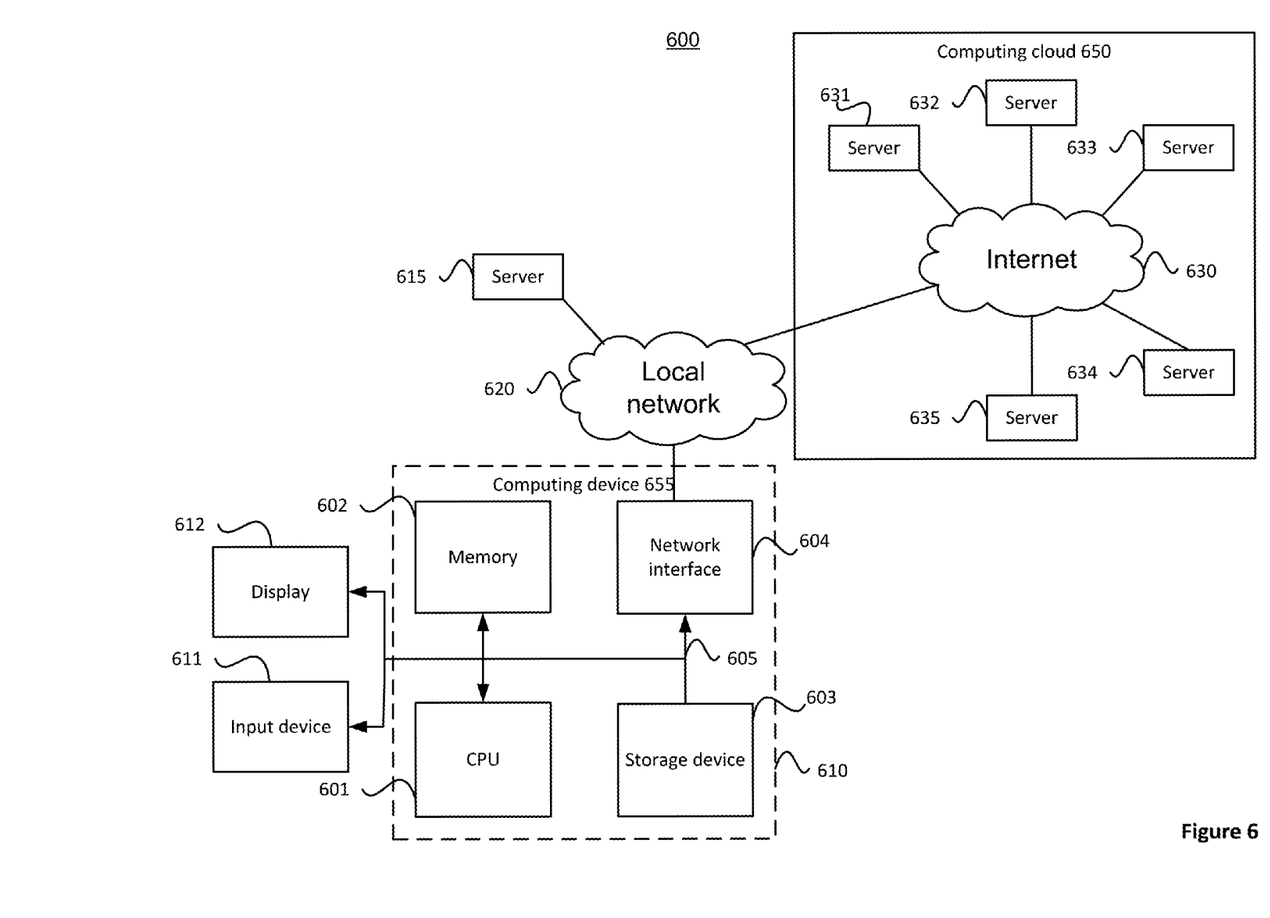
FIG. 6 is an example block diagram illustrating a computing system for measuring traffic condition based on mobile device connection information in accordance with one embodiment.

FIG. 6 is an example block diagram illustrating a computing system for measuring traffic condition based on mobile device connection information, in accordance with one embodiment.

As shown in FIG. 6, in one embodiment, the computing device 655 includes a bus 605 or other communication mechanism for communicating information, and a processor 601 coupled with the bus 605 for processing information. In one embodiment, the computing device 655 also includes a memory 602 coupled to bus 605 for storing information and instructions to be executed by processor 601 (CPU), including information and instructions for performing the techniques described above, for example. In one embodiment, the memory 602 may also be used for storing variables or other intermediate information during execution of instructions to be executed by processor 601. In one embodiment, the memory 602 includes, but is not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computing system can obtain information. In one embodiment, the storage device 603 may include source code, binary code, or software files for performing the techniques above, for example. The storage device 603 and the memory 602 are both examples of computer readable mediums.

In one embodiment, the computing device 655 may be coupled via the bus 605 to a display 612, such as a cathode ray tube (CRT) or liquid crystal display (LCD), for displaying information to a user. An input device 611 such as a keyboard and/or mouse is coupled to the bus 605 for communicating information and command selections from the user to the processor 601. The combination of these components allows the user to communicate with the computing device 655. In some systems, the bus 605 may be divided into multiple specialized buses.

In one embodiment, the computing device 655 includes a network interface 604 coupled with the bus 605. In one embodiment, the network interface 604 provides two-way data communications between the computing system 610 and the local network 620. In one embodiment, the network interface 604 includes a digital subscriber line (DSL) or a modem to provide data communication connection over a telephone line, for example. Another example of the network interface 604 is a local area network (LAN) card to provide a data communication connection to a compatible LAN. Wireless links are another example. In any such implementation, the network interface 604 sends and receives electrical, electromagnetic, or optical signals that carry digital data streams representing various types of information.

In one embodiment, the computing device 655 sends and receives information, including messages or other interface actions, through the network interface 604 across a local network 620, an Intranet, or the Internet 630. In one embodiment, the local network, the computing system 610 communicates with a plurality of other computer machines, such as a server 615 or a computing cloud 650. In one embodiment, the computing device 655 and server computer systems represented by the server 615 form a cloud computing network, which may be programmed with processes described herein. In the Internet example, software components or services may reside on multiple different computing systems 610 or servers 631-635 across the network. In one embodiment, the processes described above are implemented at the computing cloud 650, which includes one or more servers from the servers 631-635. In one embodiment, the server 631 transmits actions or messages from one component, through the Internet 630, the local network 620, and the network interface 604 to a component of the computing device 655. In one embodiment, the software components and processes described above are implemented on any computer system and send and/or receive information across a network.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

It will also be understood that, although the terms "first," "second," etc. may be used herein to describe various elements, these elements should not be limited by these terms. These terms are only used to distinguish one element from another. For example, a first user could be termed a second user, and, similarly, a second user could be termed a first user, without changing the meaning of the description, so long as all occurrences of the "first user" are renamed consistently and all occurrences of the "second user" are renamed consistently. The first user and the second computing task are both users, but they are not the user.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method comprising:
at a computer system having one or more processors and memory storing one or more programs for execution by the one or more processors:
communicating with a mobile communications device of a user;
identifying, in a plurality of geographical areas, a first geographical area;
selecting, in a plurality of cellular towers, a first cellular tower providing cellular coverage to the first geographical area;
determining a first total number of cellular signal pings received by the first cellular tower over a first predefined time period;
estimating a traffic volume factor for the first geographical area in accordance with the first total number of cellular signal pings;
estimating a traffic speed factor including an average speed for the first geographical area in accordance with a speed of movement of the mobile communications device based on the first total number of cellular signal pings; and
providing a traffic condition associated with the first geographical area to the user in accordance with the traffic volume factor and the traffic speed factor,
wherein the traffic condition is provided when a global positioning component of the mobile communications device is turned off or unavailable.

2. The method of claim 1, wherein:
the traffic volume factor corresponds to a first total number of a first plurality of users physically present in the first geographical area; and
a respective user in the first plurality of users physically present in the first geographical area is associated with a respective speed of movement.

3. The method of claim 2, further comprising:
estimating a mode of transportation for the respective user in the first plurality of users based on the respective speed of movement associated with the respective user.

4. The method of claim 2, further comprising:
obtaining information associated with the first geographical area affirmatively provided by a first user in the first plurality of users; and
providing the traffic condition associated with the first geographical area to the user, in accordance with the information affirmatively provided by the first user.

5. The method of claim 1, further comprising:
obtaining road construction characteristics associated with one or more streets within the first geographical area; and providing the traffic condition associated with the first geographical area to the user, in accordance with the road construction characteristics associated with one or more streets.

6. The method of claim 1, wherein the traffic condition associated with the first geographical area is provided to the user, responsive to a trigger event.

7. The method of claim 6, wherein the trigger event is customized by the user.

8. The method of claim 1 wherein the traffic volume factor is estimated based on cellular signal pings transmitted to a same cellular tower by multiple mobile communications devices and the traffic speed factor is estimated based on cellular signal pings transmitted by a same mobile communications device to multiple cellular towers.

9. A non-transitory computer readable storage medium storing one or more programs, the one or more programs comprising instructions, which when executed by a computing system with one or more processors, cause the computing system to execute a method of:
communicating with a mobile communications device of a user;
identifying, in a plurality of geographical areas, a first geographical area;
selecting, in a plurality of cellular towers, a first cellular tower providing cellular coverage to the first geographical area;
determining a first total number of cellular signal pings received by the first cellular tower over a first predefined time period;
estimating a traffic volume factor for the first geographical area in accordance with the first total number of cellular signal pings;
estimating a traffic speed factor including an average speed for the first geographical area in accordance with a speed of movement of the mobile communications device based on the first total number of cellular signal pings; and
providing a traffic condition associated with the first geographical area to the user in accordance with the traffic volume factor and the traffic speed factor,
wherein the traffic condition is provided to the user when a global positioning component of the mobile communications device is turned off or unavailable.

10. The non-transitory computer readable storage medium of claim 9, wherein:
the traffic volume factor corresponds to a first total number of a first plurality of users physically present in the first geographical area; and
a respective user in the first plurality of users physically present in the first geographical area is associated with a respective speed of movement.

11. The non-transitory computer readable storage medium of claim 10, the one or more programs further comprising instructions for:
estimating a mode of transportation for the respective user in the first plurality of users based on the respective speed of movement associated with the respective user.

12. The non-transitory computer readable storage medium of claim 10, the one or more programs further comprising instructions for:
obtaining information associated with the first geographical area affirmatively provided by a first user in the first plurality of users; and providing the traffic condition associated with the first geographical area to the user, in accordance with the information affirmatively provided by the first user.

13. The non-transitory computer readable storage medium of claim 10, wherein estimating the traffic volume factor for the first geographical area in accordance with the first total number of cellular signal pings includes:
identifying two or more cellular signal pings, in the first total number of cellular signal pings, as sent by a same user; and adjusting the traffic volume factor in accordance with the two or more cellular signal pings.

14. The non-transitory computer readable storage medium of claim 10, the one or more programs further comprising instructions for:
obtaining road construction characteristics associated with one or more streets within the first geographical area; and providing the traffic condition associated with the first geographical area to the user, in accordance with the road construction characteristics associated with one or more streets.

15. A system, comprising:
a mobile communications device;
a server in communication with the mobile communications device, the server comprising:
one or more processors;
memory; and
one or more programs, wherein the one or more programs are stored in the memory and configured to be executed by the one or more processors, the one or more programs including instructions for:
identifying, in a plurality of geographical areas, a first geographical area;
selecting, in a plurality of cellular towers, a first cellular tower providing cellular coverage to the first geographical area;
determining a first total number of cellular signal pings received by the first cellular tower over a first predefined time period;
estimating a traffic volume factor for the first geographical area in accordance with the first total number of cellular signal pings;
estimating a traffic speed factor including an average speed for the first geographical area in accordance with a speed of movement of the mobile communications device based on the first total number of cellular signal pings; and
providing a traffic condition associated with the first geographical area to the user in accordance with the traffic volume factor and the traffic speed factor,
wherein the traffic condition is provided to the user when a global positioning component of the mobile communications device is turned off or unavailable.

16. The system of claim 15, wherein:
the traffic volume factor corresponds to a first total number of a first plurality of users physically present in the first geographical area.

17. The system of claim 16, the one or more programs further comprising instructions for:
estimating a mode of transportation for the respective user in the first plurality of users based on the respective speed of movement associated with the respective user.

18. The system of claim 16, the one or more programs further comprising instructions for:
obtaining information associated with the first geographical area affirmatively provided by a first user in the first plurality of users; and providing the traffic condition associated with the first geographical area to the user, in accordance with the information affirmatively provided by the first user.

19. A method in a computer system comprising:
identifying, in a plurality of geographical areas, a first geographical area;
selecting, in a plurality of cellular towers, a first cellular tower providing cellular coverage to the first geographical area;
determining a first total number of cellular signal pings received by the first cellular tower over a first predefined time period;
estimating a traffic volume factor for the first geographical area in accordance with the first total number of cellular signal pings; and
providing traffic condition associated with the first geographical area to a user in accordance with the traffic volume factor,
wherein estimating the traffic volume factor for the first geographical area in accordance with the first total number of cellular signal pings includes identifying two or more cellular signal pings in the first total number of cellular signal pings as sent by a same user and adjusting the traffic volume factor in accordance with the two or more cellular signal pings.

20. A system comprising:
a processor;
a system memory; and
one or more computer programs stored in the system memory and configured to be executed by the processor, the one or more computer programs having instructions for performing operations comprising:
identifying, in a plurality of geographical areas, a first geographical area;
selecting, in a plurality of cellular towers, a first cellular tower providing cellular coverage to the first geographical area;
determining a first total number of cellular signal pings received by the first cellular tower over a first predefined time period;
estimating a traffic volume factor for the first geographical area in accordance with the first total number of cellular signal pings; and
providing traffic condition associated with the first geographical area to a user in accordance with the traffic volume factor,
wherein estimating the traffic volume factor for the first geographical area in accordance with the first total number of cellular signal pings includes identifying two or more cellular signal pings in the first total number of cellular signal pings as sent by a same user and adjusting the traffic volume factor in accordance with the two or more cellular signal pings.

* * * * *